Nov. 19, 1968    R. D. PHILBRICK    3,411,231
FOLDING FISHING ROD HOLDER
Filed Dec. 16, 1966
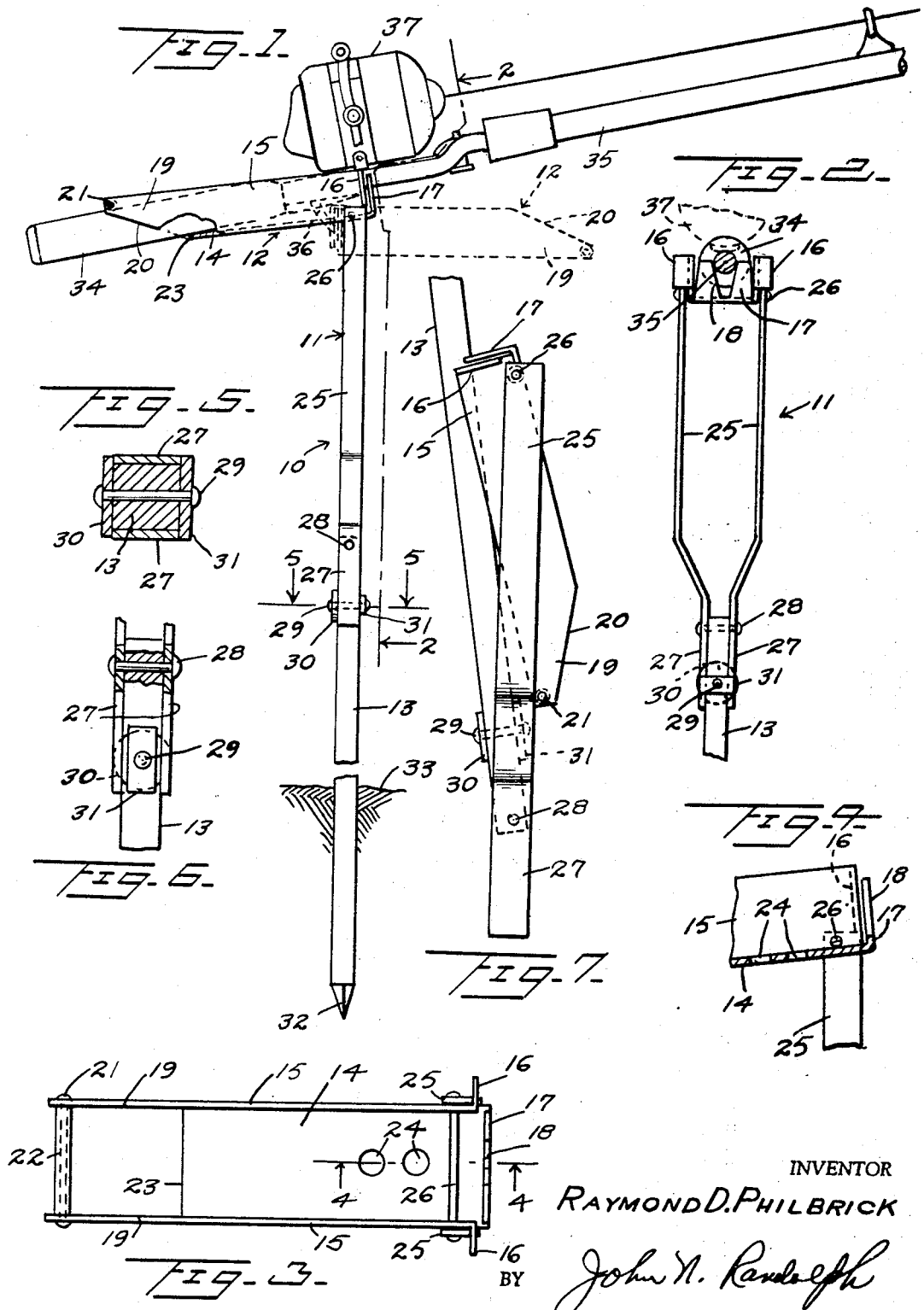
INVENTOR
RAYMOND D. PHILBRICK
BY John N. Randolph
ATTORNEY ced Nov. 19, 1968

3,411,231
FOLDING FISHING ROD HOLDER
Raymond D. Philbrick, Ericson, Nebr. 68637
Filed Dec. 16, 1966, Ser. No. 602,289
7 Claims. (Cl. 43—21.2)

ABSTRACT OF THE DISCLOSURE

A supporting standard has an upper bifurcated portion and a pivoted lower portion having a pointed end. A channel-shaped member is pivoted at one end to the upper end of the bifurcated portion. At the pivoted end the channel member has its side walls turned outwardly to provide a limiting stop in cooperation with the furcations and its bottom wall has a finger grip receiving aperture and a notched, upwardly turned end portion for securing a rod portion.

---

It is an object of the present invention to provide a fishing rod holder of extremely simple construction having a lower section providing a stake which is adapted to be driven into the earth for anchoring the rod holder in an operative position, and which includes a rod handle receiving member which is maintained in an operative position by the weight of a fishing rod applied thereto and which supports the rod against accidental detachment from the holder and against rotational movement therein, while enabling the rod to be readily applied thereto or removed therefrom.

A further object of the invention is to provide a fishing rod holder wherein the stake and rod handle receiving parts are pivotally mounted on another part of the holder to enable the rod holder to be readily folded into a compact unit which may be conveniently stored.

Various other objects and advantages of the invention will hereinafter become more fully apparent from the following description of the drawing illustrating a presently preferred embodiment thereof, and wherein:

FIGURE 1 is a fragmentary side elevational view, partly in section, showing the holder in an operative position with a spin casting rod and reel applied thereto;

FIGURE 2 is a fragmentary front elevational view thereof, taken substantially along the line 2—2 of FIGURE 1;

FIGURE 3 is an enlarged top plan view of the rod holder;

FIGURE 4 is a fragmentary vertical sectional view taken substantially along a plane as indicated by the line 4—4 of FIGURE 3;

FIGURE 5 is an enlarged cross sectional view taken substantially along a plane as indicated by the line 5—5 of FIGURE 1;

FIGURE 6 is an enlarged fragmentary front elevational view; partly in section, of a part of the holder showing a different position of one of the parts relative to the position thereof, as seen in FIGURE 2, and FIGURE 7 is an enlarged fragmentary side elevational view showing the holder in a folded position for storage.

Referring more specifically to the drawing, the folding fishing rod holder in its entirety and comprising the invention is designated generally 10 and comprises a pair of legs 11, constituting an intermediate section of the holder, a channel-shaped rod handle receiving member 12, constituting an upper section of the holder, and a stake 13 constituting a lower section of the holder. The legs 11 and stake 13 combine to form a standard having a bifurcated upper portion.

The channel-shaped member 12 is preferably formed of metal and includes a substantially flat bottom portion 14 and corresponding side walls 15 which extend upwardly from side edges of the bottom 14 and are disposed substantially parallel to one another. The walls 15 at their forward ends terminate in outturned transversely aligned flanges 16, as best seen in FIGURE 3. The bottom 14 has an upturned forward end forming a front wall 17 which is disposed forwardly of the flanges 16 and which is provided with an upwardly opening substantially V-shaped notch 18, as best seen in FIGURE 2. The side walls 15 have extensions 19 at their rear ends which extend beyond the rear end of the bottom 14 and which are beveled on their bottom edges as seen at 20 in FIGURE 1. A rivet 21 extends through the rear ends of the extensions 19 and has a sleeve 22 rotatably mounted thereon, as seen in FIGURE 3. The side wall portions 19 combine with the sleeve 22 and the rear end of the bottom 14 to define a rod handle receiving opening 23. The bottom 14 has two longitudinally spaced openings 24, for a purpose which will hereinafter become apparent.

The corresponding legs 25 of the pair of legs 11 are composed of elongated flat bars having upper ends which straddle lower forward portions of the side walls 15. A rivet 26 extends through the upper ends of the legs 25 and through the side walls 15, above and adjacent the bottom 14 and between the front wall 17 and the adjacent opening 24, as best seen in FIGURE 4, for pivotally mounting the channel member 12 on the pair of legs 11. The rivet 26 extends through upper rear corners of the legs 25 so that bottom edges of the flanges 16, which are upwardly offset from the bottom 14, will engage on the upper ends of the legs 25 as the channel member 12 is swung toward a horizontal position in a clockwise direction from its folded position of FIGURE 7.

The legs 25 have bottom portions 27 which are inwardly offset relative to the upper portions of said legs and between which one end of the stake 13 fits. A rivet 28 extends through said stake end and through the leg portions 27, near the upper ends thereof, as seen in FIGURE 2, to pivotally connect the stake 13 to the pair of legs 11. The stake 13 is of rectangular or square cross section, as seen in FIGURE 5, with the sides thereof of a width preferably corresponding to the width of the legs 25. A rivet 29 extends through the stake 13 parallel to the legs 25 and has a washer 30 mounted on one end thereof and a bar 31 mounted on its opposite end. The washer and bar engage opposite sides of the stake 13. The diameter of the washer is greater than the width of the side of the stake which it engages. The length of the bar 31 is greater than the width of the opposite side of the stake, as seen in FIGURE 5, but the width of the bar 31 is less than the width of the side of the stake which it engages, as seen in FIGURE 6. The bar 31 is mounted for rotation relative to the stake either with or on the rivet 29. The rivet 29 is located sufficiently near the pivot 28 so that when the stake 13 is in an extended position, as seen in FIGURES 1, 2 and 5, portions of the washer 30 will bear against corresponding side edges of the leg portions 27 and the ends of the bar 31 will bear against the other side edges of the leg portions 27 when the bar is disposed crosswise of the stake, for locking the stake in an extended, operative position.

With the stake thus disposed relative to the pair of legs 11 and before application of a fishing rod to the channel member 12, said channel member may be swung counterclockwise from its full line position of FIGURE 1 or from its position of FIGURE 7 to its dotted line, inverted position of FIGURE 1, for use as a handle to force the pointed lower end 32 of the stake 13 into the ground 33 by twisting action, and while exerting a downward pressure on the channel member. The channel member 12 is then swung clockwise through the legs 25 and back to its full line position of FIGURE 1 where it can be manually supported while the handle or grip portion 34 of a fishing rod 35 is inserted through the opening 23. The rod 35 is then rocked clockwise to cause a part thereof immediately in front of the handle 34 to engage in the notch 18 and so that the fingerhold 36 of the rod handle will extend down through one of the openings 24, to prevent rotation of the rod handle in the channel member 12 and to prevent the rod being pulled forward. The notch 18 engages against the forward end of a rod handle, which does not have a fingerhold, to prevent the rod being pulled forward. A reel 37 attached to the rod 35 will be disposed above the channel member 12 with a portion of said reel usually resting upon portions of the upper edges of the side walls 15. The leverage exerted by the rod 35 urges the channel member 12 to rock clockwise, as seen in FIGURE 1, to maintain the lower ends of the flanges 16, which form abutments, in engagement on the upper ends of the legs 25. The rod 35 may be swung upwardly in a counterclockwise direction to disengage it from the notch 18 and to disengage the fingerhold 36 from the opening 24 to enable the rod to be readily withdrawn from the channel member 12. The opening 23 enables the channel member 12 to accommodate fishing rods irrespective of the lengths of the handles thereof, and the sleeve 22 facilitates movement of the handles therethrough.

After removal of the fishing rod from the holder 10, the channel member 12 will swing downwardly to its folded position of FIGURE 7 between the legs 25. The bar 31 is then turned to a position lengthwise of the stake 13, as seen in FIGURE 6, so that the stake 13 can be swung about the pivot 28 in a clockwise direction, as seen in FIGURE 1, from its extended position to a folded position thereof, as seen in FIGURE 7, with a part of the stake extending through the notch 18 to retain the channel member 12 in its folded position of FIGURE 7, in which it may be placed in a tackle box for convenience in carrying.

The standard, formed by the legs 11 and stake 13, is of a length such that the reel will be 12 or 14 inches above the ground level when the stake 13 is anchored in the ground 33, as seen in FIGURE 1.

I claim as my invention:

1. A fishing rod holder comprising an elongated supporting standard having a bifurcated upper portion, an elongated rod handle receiving member of channel-shaped cross section including a forward end and a rear end, means pivotally mounting the forward end of the channel member in an upper end of the bifurcated standard portion, said channel member being adapted to receive a part of a fishing rod and having means for retaining the rod immovably therein, the weight of the fishing rod urging the channel member to rotate in one direction relative to the standard, and abutment means on the channel member engaging the furcations of the bifurcated portion to limit swinging movement of the channel member relative to the standard in said aforementioned direction.

2. A fishing rod holder as in claim 1, said channel member having an opening in the rear end thereof through which a rear portion of the rod handle is adapted to extend for accommodating fishing rod handles of different lengths.

3. A fishing rod holder as in claim 1, said means for holding a fishing rod immovably in the channel member including an upstanding front wall of the channel member having an upwardly opening notch adapted to receive a part of the fishing rod disposed immediately in front of the handle.

4. A fishing rod holder as in claim 1, said channel member having a bottom wall provided with an opening adapted to receive a fingerhold of the rod handle and constituting said means for holding the rod immovably in the channel member.

5. A fishing rod holder as in claim 1, a stake constituting a lower section of the standard, a pivot element pivotally connecting one end of the stake to the bifurcated portion near the opposite end thereof, and latch means carried by the stake for releasably latching the stake to the bifurcated portion in an extended position of the standard.

6. A fishing rod holder as in claim 5, said stake having an opposite pointed end adapted to be driven into the earth for mounting the standard in an upright position, said channel member being swingable in one direction through said bifurcated portion to an inverted position thereof to function as a handle for use in embedding the pointed end of the stake into the earth.

7. A fishing rod holder as in claim 5, said channel member being swingable in one direction from a rod holding position thereof to a folded position within said bifurcated portion, and said stake being swingable about the pivot thereof, when said latch means is in a released position, to a folded position relative to said bifurcated portion and with a part of the stake extending through a part of the channel member.

References Cited

UNITED STATES PATENTS

| | | | |
|---|---|---|---|
| 2,621,877 | 12/1952 | Grigsby | 43—21.2 |
| 2,642,690 | 6/1953 | Soenksen | 43—15 |
| 2,704,412 | 3/1955 | Davis | 43—21.2 |
| 3,309,808 | 3/1967 | George | 43—15 |

WARNER H. CAMP, *Primary Examiner.*